Sept. 4, 1928.
M. E. TAYLOR ET AL
1,683,270
RADIATION RECEIVING CONDUCTOR
Filed Aug. 25, 1923   2 Sheets-Sheet 1
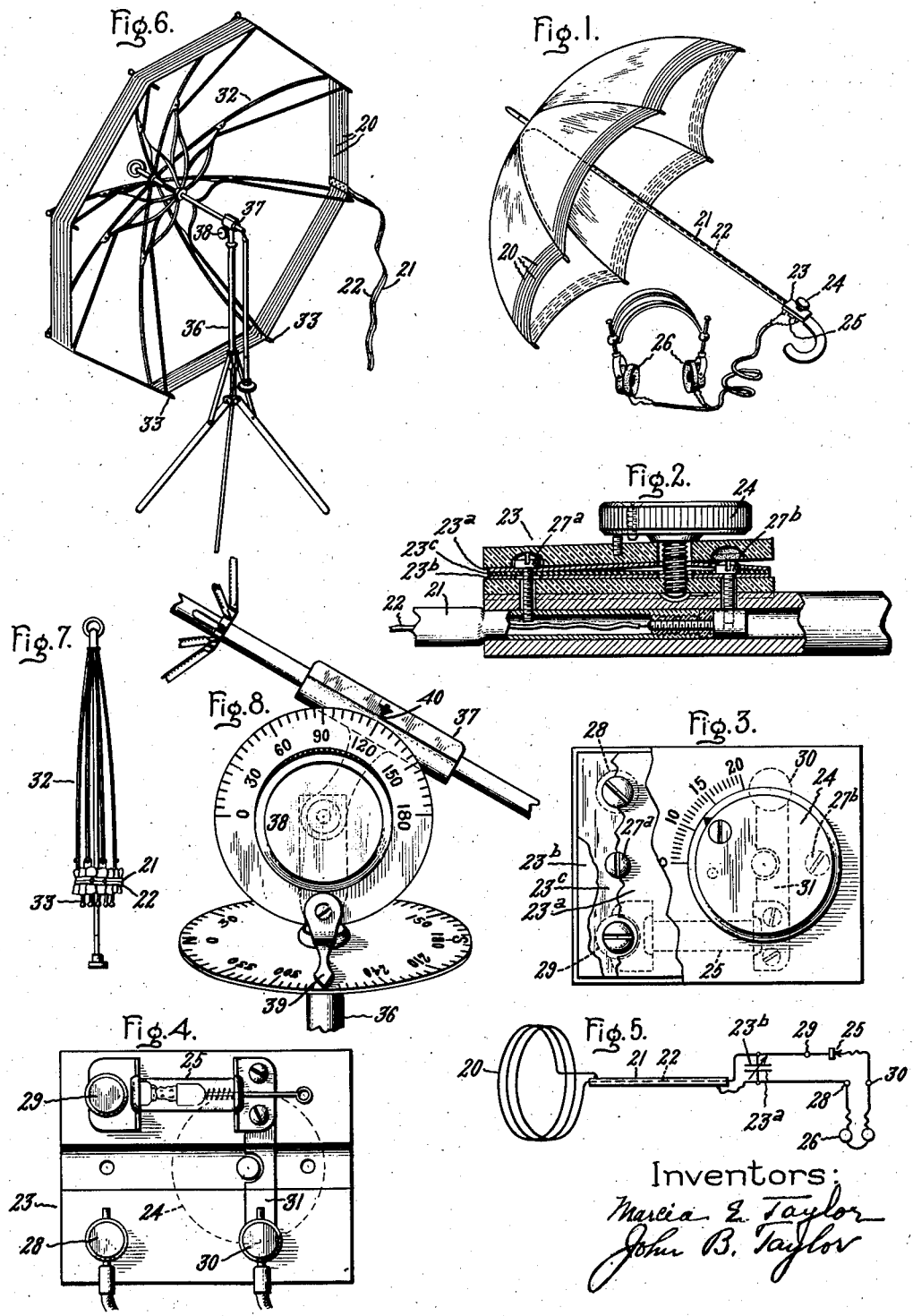

Sept. 4, 1928.  1,683,270
M. E. TAYLOR ET AL
RADIATION RECEIVING CONDUCTOR
Filed Aug. 25, 1923  2 Sheets-Sheet 2
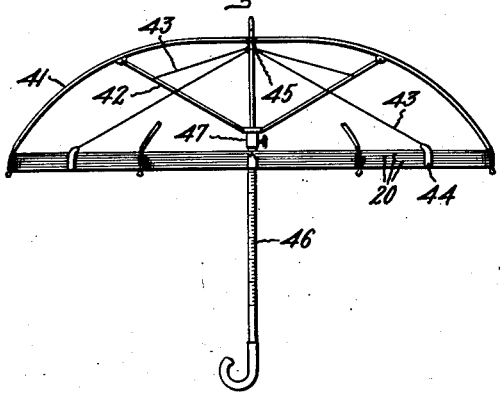
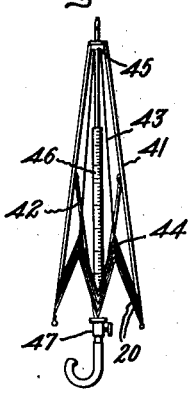
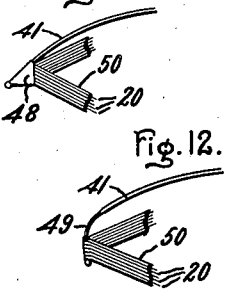
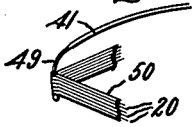
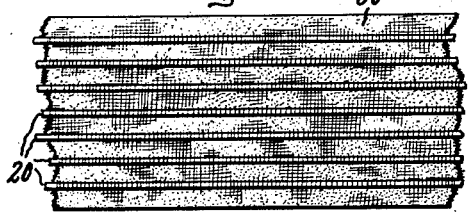
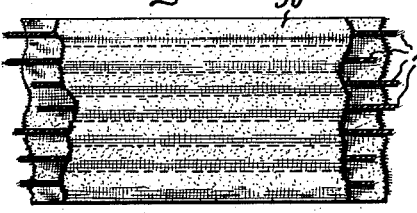
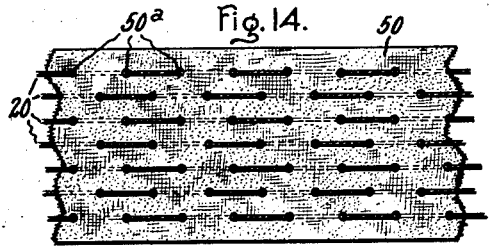
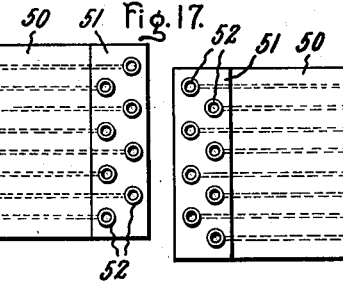
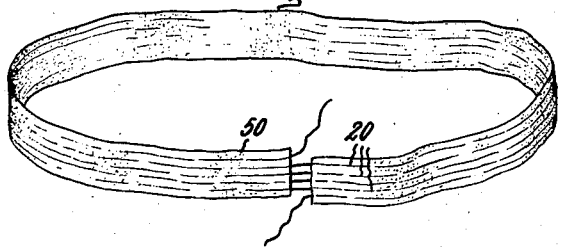
Inventors:
Marcia E. Taylor
John B. Taylor Patented Sept. 4, 1928.

1,683,270

UNITED STATES PATENT OFFICE.

MARCIA ESTABROOK TAYLOR AND JOHN BELLAMY TAYLOR, OF SCHENECTADY, NEW YORK.

RADIATION RECEIVING CONDUCTOR.

Application filed August 25, 1923. Serial No. 659,352.

In the following description and specification, our invention is so set forth that those skilled in the radio art may construct and arrange radiation receiving conductors in accordance with this invention.

Our invention relates to a form and arrangement of radiation conductor more especially adapted for use in the coil type.

The conductor of a coil aerial is usually carried on a rigid supporting frame so mounted on a vertical axis that the supporting frame and coil may be rotated so as to bring the plane of the coil to any given direction or point of the compass. The rotation is desirable or necessary since there is definite relation between the current in the coil and the direction of travel of the radiation. Rotation is used therefore to secure either the best strength of signal or to determine radiation direction.

The required manipulation of the coil accordingly makes this form of radiation receiving conductor in the majority of cases an indoor device and such indoor use makes desirable a coil of light weight, readily reducible to small dimensions for putting away or for moving from one location to another.

Our new radiation coil possesses these characteristics and has other valuable features as described later.

We have also combined with the radiation reeciving conductor, devices for tuning and detecting the radiation signals and have provided connections for the usual telephone to give audible evidence from the radiation signals. The combination of all these essential elements on a collapsible frame with handle similar to the frame of an umbrella furnishes a complete radiation receiving apparatus without any supplementary connections, of light weight and of small dimensions when the frame is collapsed. Such a portable receiver permits the operator to receive communication without interruption while moving from one place to another and by virtue of its directional properties affords a convenient and inconspicuous means of locating a radiation source by a process of triangulation from two or more observing points.

As an additional new and useful improvement, we have arranged a mounting for the coil which permits setting the coil plane in any altitude in addition to the common practice of mounting the coil in a vertical plane swinging to any azimuth.

Selecting a given altitude plane for the coil is desirable as we find that, due to the proximity of conducting wires, pipes and structural material, secondary oscillating currents are set up in such conductors which combine with the electric and magnetic fields of the primary radiation to produce resultant fields with direction such as to give, in many locations, maximum signal strength with the coil plane at some altitude other than the vertical position commonly provided.

Our invention will be made clear by the following description in combination with the accompanying drawings:

Fig. 1 shows a complete radiation receiving equipment assembled on an umbrella.

Fig. 2 shows connection details and a portion of the condenser-detector combination.

Fig. 3 shows a top view of the condenser-detector combination with portions cut away to show condenser construction and a method of making connections to crystal detector and telephones.

Fig. 4 is a bottom view of the condenser-detector combination.

Fig. 5 shows diagrammatically the connections of the coil to condenser-detector and telephones.

Fig. 6 shows one form of aerial coil mounted on a collapsible stand in a manner permitting turning the plane of the coil to any desired altitude or azimuth.

Fig. 7 shows the same coil and frame folded and fastened.

Fig. 8 gives a detail of the adjustable holding of the coil and frame, and shows also graduated circles indicating the plane of the coil in altitude and in azimuth.

Fig. 9 illustrates a modified form of conductor and frame so arranged that the conductor is taut in open, in closed, and in intermediate positions.

Fig. 10 shows the conductor and frame of Fig. 9 partially closed.

Figs. 11 and 12 show alternative methods of fastening a band of conductors to the ends of the extension members of collapsible frames.

Figs. 13, 14 and 15 are alternative constructions of flexible insulative material carrying a number of separated conductors.

Fig. 16 is a cross-section of the flexible ribbon and conductors of Fig. 15.

Fig. 17 shows the terminals of a number of conductors carried by a flexible insulative tape.

Fig. 18 illustrates the joining of a number of conductors carried by an insulative ribbon to form a single multi-turn conductor.

In Fig. 1, a flexible conductor or multi-turn conductors 20 are sewed to the edge of an umbrella cover or otherwise incorporated in the insulative cover fabric. When the umbrella frame is closed, the flexible conductor occupies small space,—and, when the umbrella is open, the extended coil has a substantial area intercepting sufficient of the radiating energy to actuate responsive devices. In this particular arrangement, the coil terminals 21 and 22 are carried to a condenser 23, the capacity of which is adjustable by means of knob 24. The leads from the aerial coil terminals also connect through the crystal 25 to the telephones 26.

The umbrella frame may be of any material. A common form of frame has flexible metal ribs and stretchers assembled on a hollow steel rod. With the parts arranged as shown in Fig. 1, the hollow conducting rod is desirable as it may serve to conceal and protect the insulated lead 22, while the rod itself serves for the other side of the circuit 21. It is important that the side of the circuit in electrical contact with the rod and ribs of the umbrella should lead directly to the head telephones, while the crystal contact detector connects to the protected side of the circuit 22. This arrangement is shown in connection diagram, Fig. 5, and, when followed, permits grasping the umbrella rod by the hand without appreciably altering the electrostatic capacity of the circuits on which tuning and strength of signals depends.

The adjustable condenser shown in Fig. 2 consists of a novel arrangement of two or more metal plates 23$^a$ and 23$^b$ of which one or more are curved. As the plates are flattened by the adjusting knob and screw 24, there is a reduction of the air space between the plates in addition to the separating sheet or sheets of mica 23$^c$ or other suitable dielectric.

The use of curved elastic material for the condenser plates eliminates back-lash,—thus giving a definite capacity value for a given setting of the index of the adjusting knob. This permits the outfit to be brought to any position or used while in motion without alteration of capacity due to jarring and vibration.

In addition to these advantages, by shaping the spring condenser plates to some particular curve, the increase in capacity as the adjusting knob is turned can be made more rapid than the turning of the knob. This tends to give a more uniform or open scale of wave lengths.

Since the arrangement is a complete receiving set without supplementary connections to antenna or ground, the oscillation frequency or wave length corresponding to any given dial setting may be indicated by figures properly located on the tuning scale.

With the arrangement shown in Figs. 1, 2, 3 and 4, the same screws 27$^a$ and 27$^b$ serve to hold the condenser plates in position,—to hold assembled the tuner, the umbrella handle and the rod,—and also to make electrical connections between the coil terminals 21 and 22 and the metal plates of the condenser 23. Binding posts 28 and 29 are in electrical contact with the two sides of the condenser.

One terminal of the telephones is connected to post 28, while the other terminal connects to post 30, which, in turn, leads through the connection strap 31, through the detector 25, to connection post 29.

In Fig. 6 the conductors of the aerial coil are shown incorporated with an insulative fabric band held to a special form of collapsible spring frame 32. This frame has the ribs so articulated that when in the extended position the ends of the ribs 33 to which the conductor band is fastened are parallel to each other and to the central supporting rod. The parallelism of the rib ends favors the fastening of the band of conductors in a smooth position without puckering at the points of support where the direction changes. This figure also shows the coil and frame held by a folding stand or tripod 36 adjustable in height. The axis of the stand may be turned, bringing the plane of the coil to any desired azimuth, while the clamp 37, which grips the rod of the frame is held by a clamping screw 38 to any desired angle in altitude. When collapsed, the frame and aerial coil of Fig. 6 take the form shown in Fig. 7. The terminal leads 21 and 22 may be used as indicated to bind into a compact bundle the several folds of the collapsed coil.

The stand and adjustable clamp may be fitted with graduated circles and pointers as indicated in Fig. 8. These will show the position of the coil in azimuth 39 with reference to the north and south points of the compass; and also show the angle of the coil in altitude 40 with reference to the level surface of the earth.

An alternative form of supporting the collapsible aerial conductor is shown in Fig. 9. In this construction, the one or more turns of the coil are fastened to the ends of the ribs or flexible members 41 of the frame. A cord 43 is attached to the conductors at a point 44 midway between the point of attachment of the conductor to the ends of the ribs. From this midway point of attachment, the cord 43 is carried through a pulley or eye 45 at the apex of the frame and continued to a point of fastening on one of the strut members 42.

By properly locating the point of attachment of the cord 43 on the strut 42 the conductor is drawn up and held close to the ribs and central rod when the frame is collapsed. The elasticity of frame members and cord also hold the conductors taut for intermediate positions between fully opened and fully closed, one of which positions is indicated in Fig. 10. One desirable feature of this arrangement is that, when the frame is closed, there are no loose conductors to become knotted or snarled, and no necessity for gathering in the folds of conductor band to make the apparatus compact.

An additional advantage obtained from an aerial coil of this construction is that the inductance of the coil may be adjusted between a certain maximum and minimum range by partially opening or closing the frame. As indicated in Fig. 9, the central rod of the frame may be provided with a scale or calibration 46 indicating the extent to which the frame is open, the inductance of the coil, or, in combination with tuning condenser and other receiving apparatus, indicating the oscillation frequency or wave length for which the apparatus is tuned. When so employed, the runner 47 should be provided with a spring grip or clamping screw so that it may grip the rod firmly at any desired position.

While variation of the inductance or tuning of the receiving set may be accomplished by variation in opening or closing of the forms of collapsible frames and coils described and illustrated earlier under Fig. 1 and under Fig. 6, with these forms the folds of the conductor occupy somewhat indefinite positions when partially closed and are therefore not so well adapted as the construction shown in Figs. 9 and 10 to use with a calibrated scale in quantitative work.

Still other alternative frame and conductor supporting constructions are shown in part in Figs. 11 and 12. In Fig. 11, 41 indicates the end of a flexible supporting rib such as is commonly used in umbrellas and parasols. As the end of this in the open position is not parallel with the other rib ends and central rod, the fabric 50 carrying the several conductors 20 will not conform readily to the ends of the ribs. Accordingly a gusset 48 of cloth or other flexible insulative material is applied to fill up the angle between the fabric conductor band and the rib ends. The extension of the gusset holds the conductor band evenly and firmly when the frame is extended—while in the collapsed position of the frame, the gusset folds on itself and allows the conductor folds to be neatly wrapped about the frame.

Another means of supporting the conductor band evenly without resorting to the special articulated end of Fig. 6 or the gusset of Fig. 11 is the use of a rib with flexible end 49 as shown in Fig. 12. Here the tension of the fabric conductor loop bends down the several rib ends of the frame to positions in which the rib ends are parallel one with another, thus giving a figure to which the flat fabric band readily conforms while the elasticity of the rib end holds the fabric band without slack.

In the construction of a multi-turn, aerial, radiation receiving coil, it is desirable that the conductor turns be maintained a definite distance apart, each one from the next. If the turns are placed too close together, the increase in electrostatic capacity resulting from the small separation prevents the electrical oscillations between inductance of the coil and capacity provided for resonating with the coil from building up to a maximum electrical pressure at the terminals of the coil to which the electron tube detector or other form of receiving device is connected. On the other hand, if the turns are too widely separated, the self-induction for a given length of conductor is reduced, which reduction also, works to limit the building of pressure on a given receiving set. There is, therefore, a given separation of conductors in an aerial coil which calculation or experiment indicates to be best.

An effective means of maintaining the desired definite separation between conductor turns is to fasten the individual conductors to an insulative band of fabric, or other material,—or the conductor turns may be held by the insulative fabric in the desired position by incorporating a conductor with the fabric. Several alternative means of acomplishing this are indicated in the figures accompanying this specification.

For example:
In Fig. 1 previously described, the conductors are sewed to the fabric;
In Fig. 13, the conductors 20 are carried through the loom and woven into the fabric as it is produced;
In Fig. 14, the insulative band 50 has a number of perforations 50ª at slight distances apart through which the conductor 20 is drawn;
In Fig. 15, the fabric is made up with a number of channels or tubes, through which channels conductors 20 are drawn. This tubular or channel ribbon may be constructed by sewing together two simple ribbons,—or, by special set-up of loom, the multi-tubular ribbon or tape may be woven in any length desired.

A multi-conductor ribbon made up according to any of the methods suggested may have the conductors connected up in a variety of different ways to meet the electrical circuit requirements. We have found a convenient method of disposing of the terminals of the conductors to be that indicated in Fig. 17. Here the ends of the insulative ribbon 50 reinforced if necessary for increasing mechanical strength by the strips of insulative material 51 are pierced for a common form of metal eyelet 52 to which eyelet the conductors 20 are mechanically and electrically attached by crimping the eyelets,—and, perhaps, in addition, by soldering. With this arrangement, the eyelets serve a triple purpose of:

(a) Joining the two ends of the insulative ribbon into a single closed belt.

(b) Electrically joining the end of one conductor turn to the beginning of the next turn.

(c) Serving as electrical terminal or tap points for bringing into circuit all or a portion of the conductor turns so connected.

By placing the terminal eyelets 52 according to a definite pattern, the two ends of the conductor band may be superposed in such a way as to connect all the turns in an electrical series. As this serial arrangement of all the turns is that most commonly employed with aerial radiation receiving coils, the conductor band may be made up permanently with this serial connection, in which case the same metal eyelet serves as the end of one conductor and for the beginning of the next.

The forming of the flexible insulative multi-conductor band into a single loop with all conductors in series is indicated diagrammatically in Fig. 18.

We claim:

1. In combination with a collapsible frame structure adapted to be opened and closed comprising a central supporting rod and ribs pivotally secured thereto and radially extended therefrom, a sleeve adapted to slide along said rod, struts pivoted to said sleeve and to said ribs and controlling the movement of said ribs, hinged tips on said ribs to which a flexible radiation conductor may be secured, links each of which is pivoted on one end to one of said hinged rib tips and on the other end to one of said struts whereby said tips are maintained substantially parallel to said central rod when said frame is in its open position, a self-supporting stand for said structure, and an adjustable clamp mechanically inter-connecting said structure and said stand, whereby said radiation conductor may be given any desired position in altitude and azimuth.

2. A radio receiving loop structure comprising a collapsible umbrella-like frame adapted to be opened and closed, said frame having ribs pivotally attached to a central supporting rod, a radiation-receiving conductor secured to said ribs near the ends thereof, means whereby said band may be maintained parallel to said rod when said frame is opened and when said frame is closed, and a fabric band containing at least one electrical lead, said band being secured at one end to a portion of said structure, said lead being connected to said radiation-receiving conductor at the same end and adapted to be connected to a radio receiver at the other end, said fabric band serving to bind into a compact bundle said radiation-receiving conductor when said frame is collapsed.

3. In combination with a collapsible umbrella-like frame adapted to be opened and closed, said frame having ribs pivotally attached to a central supporting rod, a radiation-receiving-conductor band secured to said ribs near the ends thereof, and means whereby said band may be maintained parallel to said rod when said frame is open and when said frame is closed.

4. A collapsible frame adapted to be opened and closed comprising a central supporting rod and ribs pivotally secured thereto and radially extending therefrom, a sleeve adapted to slide along said rod, struts pivoted to said sleeve and to said ribs for controlling the movement of said ribs, hinged tips on said ribs to which a flexible radiation conductor may be secured, and links each of which is pivoted on one end to one of said hinged rib tips and on the other end to one of said struts whereby said tips are maintained substantially parallel to said central rod when said frame is in its opened position.

In testimony whereof we affix our signatures.

MARCIA ESTABROOK TAYLOR.
JOHN BELLAMY TAYLOR.